(12) United States Patent
Sabbagh

(10) Patent No.: US 7,670,074 B2
(45) Date of Patent: Mar. 2, 2010

(54) VIDEO SLIDE PROJECTION BOOK

(75) Inventor: Julia Sabbagh, South Salem, NY (US)

(73) Assignee: Reader's Digest Children's Publishing, Inc., Pleasantville, NY (US)

( * ) Notice: Subject to any disclaimer, the term of this patent is extended or adjusted under 35 U.S.C. 154(b) by 693 days.

(21) Appl. No.: 11/267,562

(22) Filed: Nov. 4, 2005

(65) Prior Publication Data

US 2006/0051158 A1    Mar. 9, 2006

Related U.S. Application Data

(63) Continuation of application No. 10/137,925, filed on May 2, 2002, now Pat. No. 7,217,055.

(51) Int. Cl.
*B42F 13/40*    (2006.01)
*B42F 13/12*    (2006.01)

(52) U.S. Cl. .......................................... 402/4; 402/80 R

(58) Field of Classification Search ..................... 402/4, 402/79, 80 R, 80; 281/29, 45, 51; 355/120, 355/122

See application file for complete search history.

(56) References Cited

U.S. PATENT DOCUMENTS

| 3,566,370 | A | * | 2/1971 | Worhtington, Jr. et al. .. 600/523 |
| 3,594,077 | A | * | 7/1971 | Marquis et al. ............... 353/94 |
| 3,802,772 | A | * | 4/1974 | St. Clair, II ................... 353/94 |
| 4,240,721 | A | * | 12/1980 | Drop, Sr. ...................... 353/74 |
| 4,420,234 | A | * | 12/1983 | Dolejsi et al. ................ 353/122 |
| 5,066,158 | A | * | 11/1991 | Huang ............................ 402/4 |
| 5,633,674 | A | * | 5/1997 | Trulaske et al. ............... 348/63 |
| 7,217,055 | B2 | * | 5/2007 | Sabbagh ........................ 402/4 |

* cited by examiner

*Primary Examiner*—Will Fridie, Jr.
(74) *Attorney, Agent, or Firm*—Kenyon & Kenyon LLP

(57) ABSTRACT

A video slide projection book is shown. The video slide projection book has a front cover and a back cover connected to the front cover at a binding. A plurality of pages are interposed between the front cover and the back cover and are connected to the binding. The video slide projection book also has a projector configured to accept a video slide source. The projector is configured to have a casing defining an interior volume; a circuit positioned in the interior volume and a lens. A holder is connected to the back cover wherein the holder is configured to accept the projector.

13 Claims, 9 Drawing Sheets

VIDEO SLIDE PROJECTION BOOK

CROSS-REFERENCE TO RELATED APPLICATIONS

This application is a continuation application of U.S. patent application Ser. No. 10/137,925, filed May 2, 2002 now U.S. Pat. No. 7,217,055, the entire disclosure of which is incorporated herein by reference.

FIELD OF THE INVENTION

The present invention relates to a reading material source which projects video information onto a viewing surface. More specifically, the invention relates to a book with an attached projector to project video slide images while the book is being read.

BACKGROUND INFORMATION

Teaching people to read, especially children, fosters greater literacy and knowledge among the general populous. Getting children to read, unfortunately, can be a laborious task. Many reading materials are unattractive to the eye and do not foster imagination among the potential reader. The less than appealing designs of reading materials often result in an apathetic reader or avoidance of reading altogether.

To encourage reading, some reading materials have attractive and/or fanciful color designs or pictures to entice the reader. Often, however, these materials are located only on the exterior cover of the materials causing the reader to lose interest on the interior pages. Reading materials with pictures or design work on the interior pages are common but have inherent problems in themselves. These problems include expensive printing costs, and thick volume size due to the increased number of pages due to the artwork.

Common reading materials also have another significant drawback. For the material to be seen, a proper viewing perspective must be maintained by the reader (i.e. the book must be in front of the reader.) A young child must often crowd next to an adult to view the text and/or artwork in the book. If multiple children are present, viewing can become even more restrained as each child tries to obtain a proper perspective of the book. The reader must often stop and show the pages to the children, slowing the pace of the story, and affecting interest in the work for all involved. In large families or in classroom situations, the problems presented are self-evident.

Children retelling a previously read story is also a significant part of the reading experience. The retelling of the story by the child fosters memory recall and imagination. If a child does not have visual cues upon which to initiate successive steps in the story, the child may not want or be able to retell the story. Reading materials without visual prompts, therefore, lack a critical feature in the learning process.

It is therefore desired to have reading materials which do not have these drawbacks and which encourage reading, especially among younger people.

SUMMARY OF THE INVENTION

It is an object of the present invention to provide reading materials which have features which attract the attention and interest of individuals, especially young children, while providing a projected image during reading of the book. It is also an object of the present invention to allow simplified operation of the reading materials.

It is also an object of the present invention to allow multiple persons to enjoy the reading material from different viewing perspectives.

It is a further object of the present invention to foster imagination and storytelling abilities of young readers in connection with a reading material.

These and other objects of the invention, which will become apparent from the following detailed description, are achieved as described. The invention provides a reading device. The reading device comprises a book and a slide projector coupled to the book.

A method to convey information to a reader is also described. The method comprises inserting a video slide source into a projector; actuating the projector; projecting an image from the projector; reading a book until operating instructions require advancing the video slide source and advancing the slide source.

DETAILED DESCRIPTION OF THE INVENTION

Figure 1:
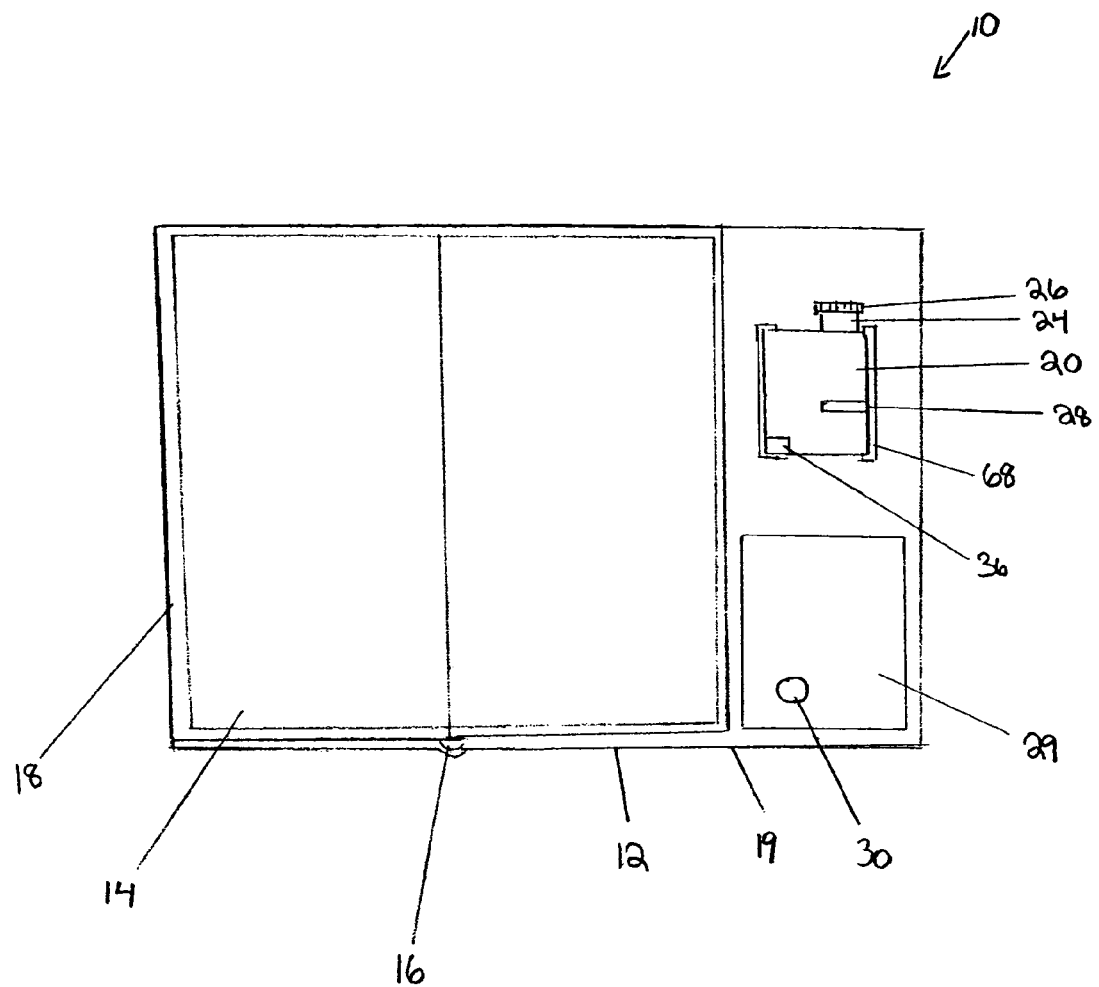
FIG. 1 is a top perspective view of a video slide projection book according to the present invention.

Referring to FIG. 1, a video slide projection book 10 in conformance with the invention is shown. The video slide projection book 10 is comprised of a book 12 which has a front cover 18 and a back cover 19. The front cover 18 and the back cover 19 are connected through a spine 16. Pages 14 are placed between the front cover 18 and the back cover 19 and are held togther by a spine 16. Although the spine 16 is shown as a glue end type, those skilled in the art will recognize that other types of spines will be equally appropriate, including spiral and multi-ring binders and that the figure shown is an exemplary embodiment only. A holder 68 for holding a projector 20, described later, is attached to the back cover 19 of the book 12. The holder 68 may be made of plastic, for example, and attached to the back cover 19 through glue or other appropriate connection. As with all types of reading materials, the front cover 18 and back cover 19, as well as the pages 14, may optionally be decorated with eye-catching artwork for the reader.

A video bin 29 is attached to book 12 to provide storage space for video slide sources 30 described later. The video bin 29 may be a molded plastic unit that may have front, back and side portions to allow video slide sources 30 to be held in place through a snap type or other connection arrangement. The video bin 29 may be attached to the covers 18, 19 in any manner to keep the video slide sources 30 in close proximity to the projector 20. The front of the video bin 29 may be movable to allow easy access to the video slide sources 30. As will be understood by those skilled in the art a bag may be used to store video slide sources.

Figure 2:
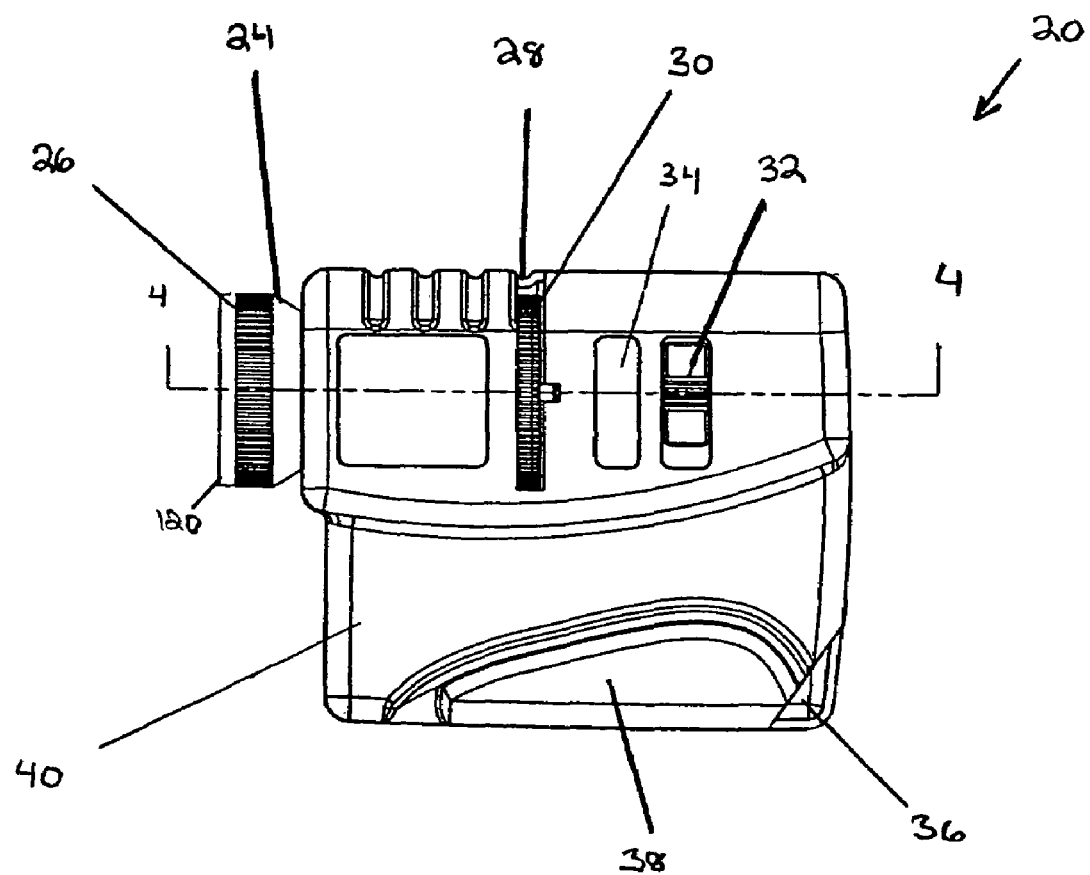
FIG. 2 is a top view of the front of a projector.

Referring to FIG. 2, a side view of the projector 20 is shown. The projector 20 allows insertion of the video slide sources 30 for projection of an image onto a viewing surface such as a screen, or a wall for example. The projector 20 has an external casing 40 which protects internal components, described later. The casing 40 may be made of plastic, for example, or other similar impact resistant material. The casing 40 may be manufactured through blow molding, compression molding, stamping, injection molding or other forming technique as an example. The projector 20 has a grip 38 which may be used by an operator to easily hold the projector 20 when not secured to the book 12. As will be obvious to those skilled in the art, the grip 38 may optionally be covered or formed with a rough surface to increase holding capability for the user. A transparent side portion 36 of the casing 40 allows transmission of light from a reading source bulb 61. The transparent side portion 36 may be manufactured of impact resistant plastic similar to the casing 40 to prevent breakage of the portion 36 if the projector 20 is dropped or struck by an object.

The projector 20 has a lens 24 to allow images to be projected by the user. The lens 24 may have a first lens 50, a second lens 52 and a focusing ring grip 26 to allow easy manipulation by the user. Although shown with ridges, the focusing ring grip 26 may have other contact surfaces to allow focusing. Both the lens 24 and the focusing ring grip 26 may be made of plastic or other similar material to provide shatterproof operation while being light weight. Although shown as a focusing type lens, the lens 24 may also be a fixed type lens. Additionally, the grip 26 may be made of rubber to add frictional control upon gripping. An optional cap 120 may also be attached to the lens 24 to provide protection against object impact.

The projector 20 has a slot 28 which is used to accept the video slide source 30. As shown, the video slide source 30 protrudes outside the external casing 40 when inserted in the projector 20. The slot 28 is geometrically configured to allow acceptance of the video slide source 30 to produce accurate alignment between an internal light (i.e. a bulb 60) and the video slide source 30, to project an image through the focusing lens 24. The video slide source 30 may be inserted into the slot 28 up to a stop 98. The stop 98 supports an axle 76 of the video slide source 30 allowing proper alignment of the bulb 60 and video slide source 30.

Figure 9:
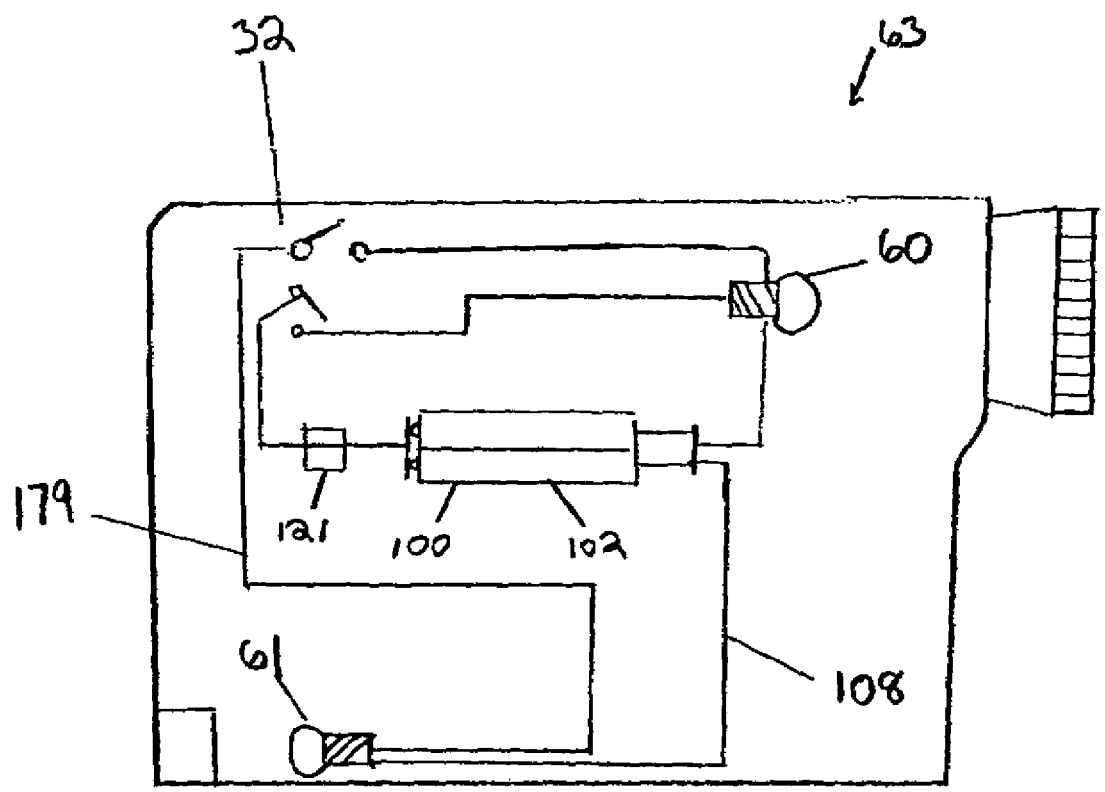
FIG. 9 is an example embodiment of a circuit.

A switch 32 located on the exterior casing 40 allows power activation of the light source 63, as shown in FIG. 9, of the projector 20. The light source 63 may be a single video source bulb 60 or a video source bulb 60 and a reading source bulb 61. The switch 32 may be opaque or be optionally backlit when the light source 63 is activated. In an example embodiment, the switch 32 has three positions of operation. A first position allows the video source bulb 60 to be activated to project an image. A second position allows the video source bulb 60 to be deactivated. A third position allows both the video source bulb 60, as well as a reading source bulb 61, to be activated. The reading source bulb 61 allows illumination of the pages of the book in dark room environments. Other types of switches may be used such as a two position on/off switches or other similar units. The embodiment shown in the figures, therefore, is an illustrative example only. User instructions for switch operation may be located on a switch instruction area 34. Instructions may be attached by use of a sticker, molding into the casing, or other appropriate informational conveyance.

Figure 3:
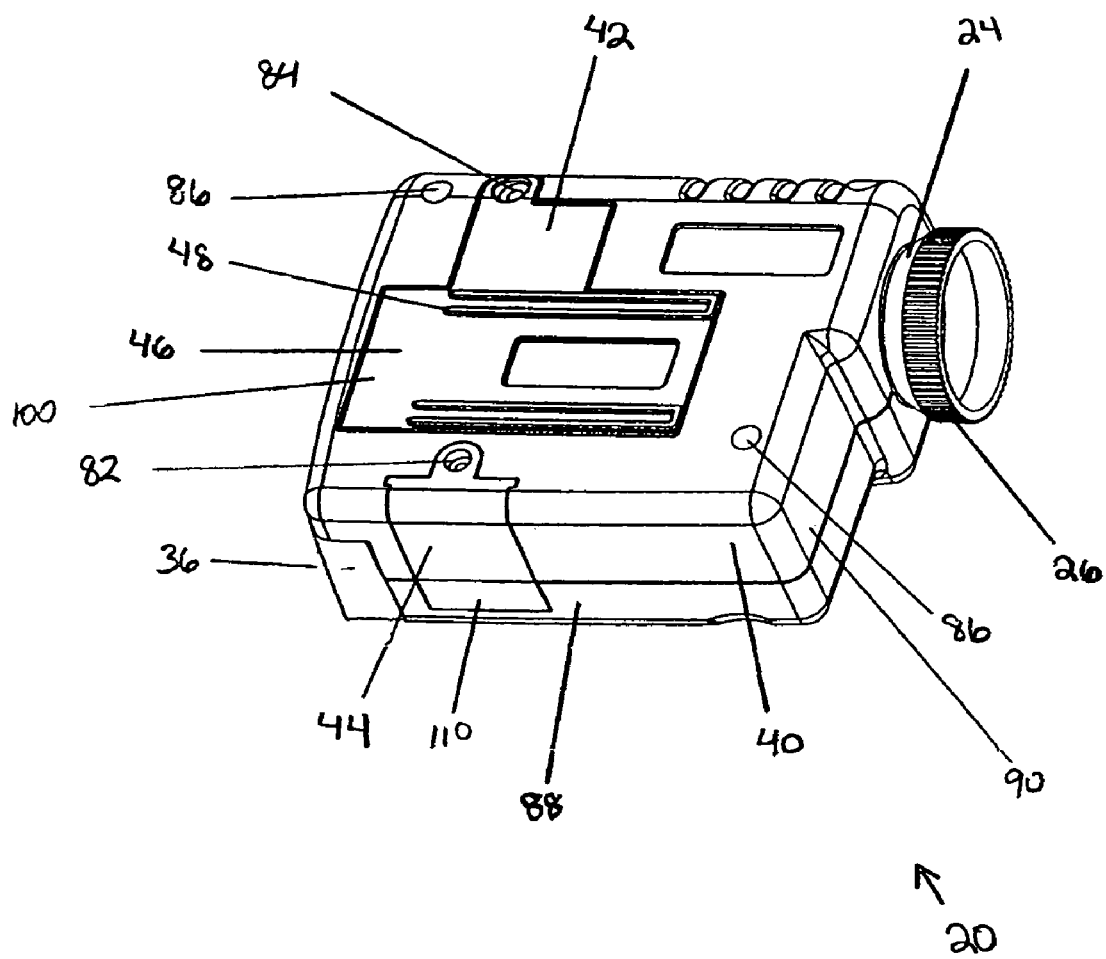
FIG. 3 is a side perspective view of the back side of the projector of FIG. 2.

Referring to FIG. 3, a perspective view of the back portion of the projector 20 is shown. A first cover 42 is attached to the exterior casing 40 through a first screw 84. Removal of the first cover 42 exposes an internal power source compartment 100. Although shown as a screw type attachment, it will be understood that any appropriate attachment may be established between the first cover 42 and the exterior casing 40 to provide positive connection between the casing 40 and the cover 42. The first cover 42 has a projector support acceptor surface 46 used to mate with the holder 68. As shown, the first cover 42 slidingly mates with the holder 68 through ridges 72 which interlock with a ridge acceptor 48. Mating between the projector 20 and the holder 68 may be performed by various appropriate attachments including, but not limited to, clips, friction inserts or rotational attachment and as such, it is not the intention to limit the current disclosure to the view presented. The holder 68 and the projector 20 may be formed as a one piece fixed unit together with the front cover 18 and/or back cover 19. Referring to FIG. 9, a power source 102 is installed in the power source compartment 100 to provide energy to the video source bulb 60 and/or the reading source bulb 61. The power source 102 may include, for example, disposable batteries, rechargeable batteries or other similar units. The power source 102 is installed in the power source compartment 100 in such a way to allow projector 20 operation in various conditions, such as while the book 10 is at rest or while undergoing jarring conditions.

Referring to FIG. 3, a second cover 44 is connected to the casing 40 through a screw attachment 82. As with previous attachments described, various attachments may be employed to connect the second cover 44 to the casing 40 and as such the disclosure is not limited by the example configuration presented. The second cover 44 together with the casing 40 define a light source cavity 110 used for housing the reading source bulb 61.

The casing 40 may be made of two casing halves which define an interior volume 150. A series of casing screws 86 provides attachment between a casing first half 88 and a casing second half 90. As will be recognized by those skilled in the art, attachments other than screws may be used and that the drawings only show an example embodiment of the invention.

Figure 4:
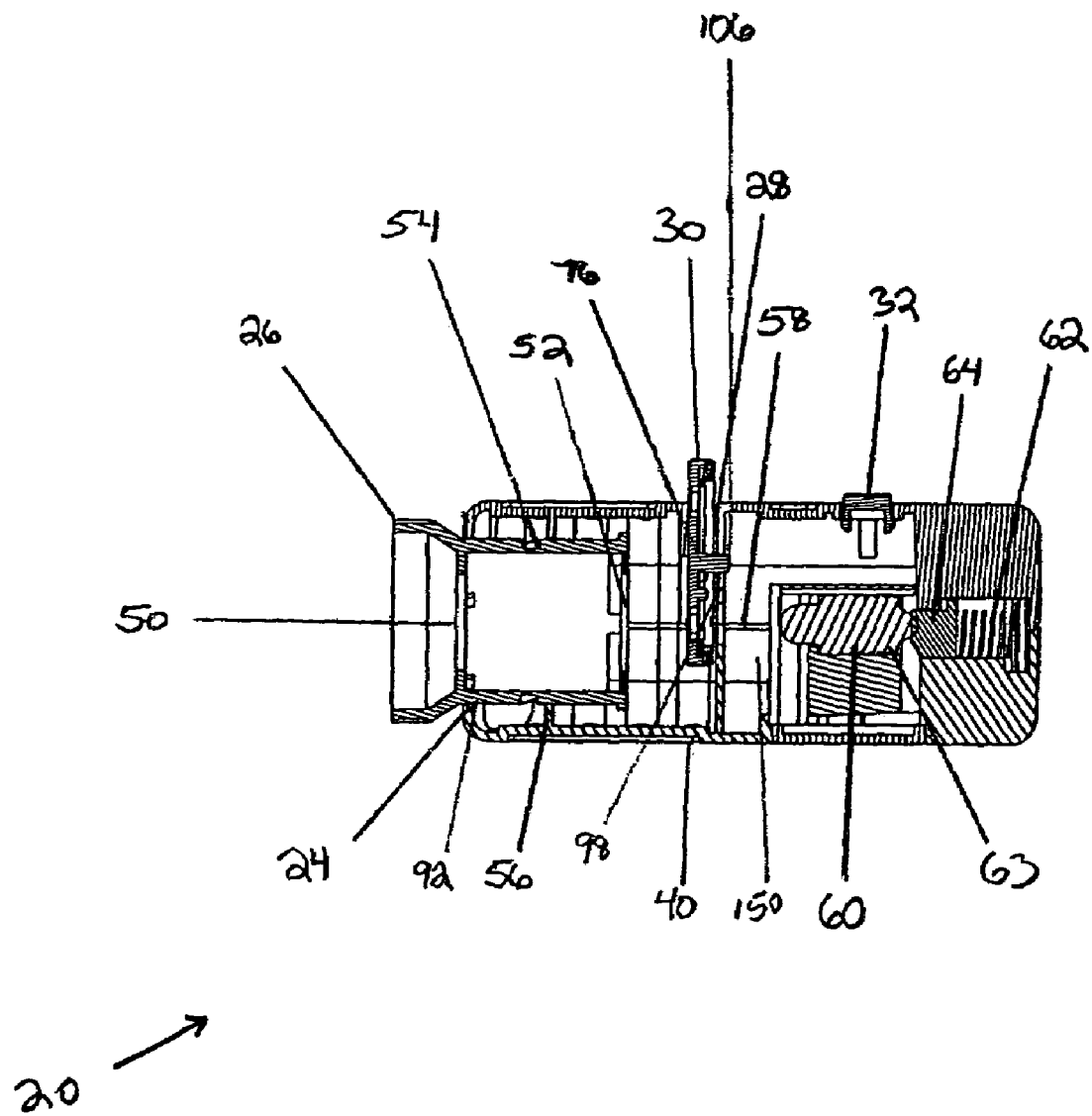
FIG. 4 is an internal cross section of the projector of FIG. 2 along line 4-4.

Referring to FIG. 4, an internal cross section of the projector of FIG. 2 along line 4-4 is shown. The first lens 50 and a second lens 52 allow light which is generated by the video source bulb 60 to pass through the front of the projector 20. The lenses 50 and 52 may be made of any optically transparent material, such as for example, plastic or impact resistant glass, to allow optical transmission of a video image. Although shown as a multiple element lens 24, it will be understood that single element units may be used to provide transmission of the image. The individual lenses 50 and 52, may magnify images to a desired enlargement based upon the distance of the video projector 20 to a projection surface. A lens housing 92 provides support for the lens 50 to the body of the projector 20. The lens housing 92 is supported by a projection 56 which fits into a helical guide 54. The helical guide 54 allows for rough and fine tuning of image focus by allowing the lens 24 to move independently from the casing 40. The projection 56 and corresponding helical guide 54 may be of any corresponding shape to allow retention of the lens 24 to the casing 40 within a defined limitation of movement. Although shown as a helical guide 54, other configurations may be used to establish focus control including, as an example, a telescoping mount.

Figure 7:
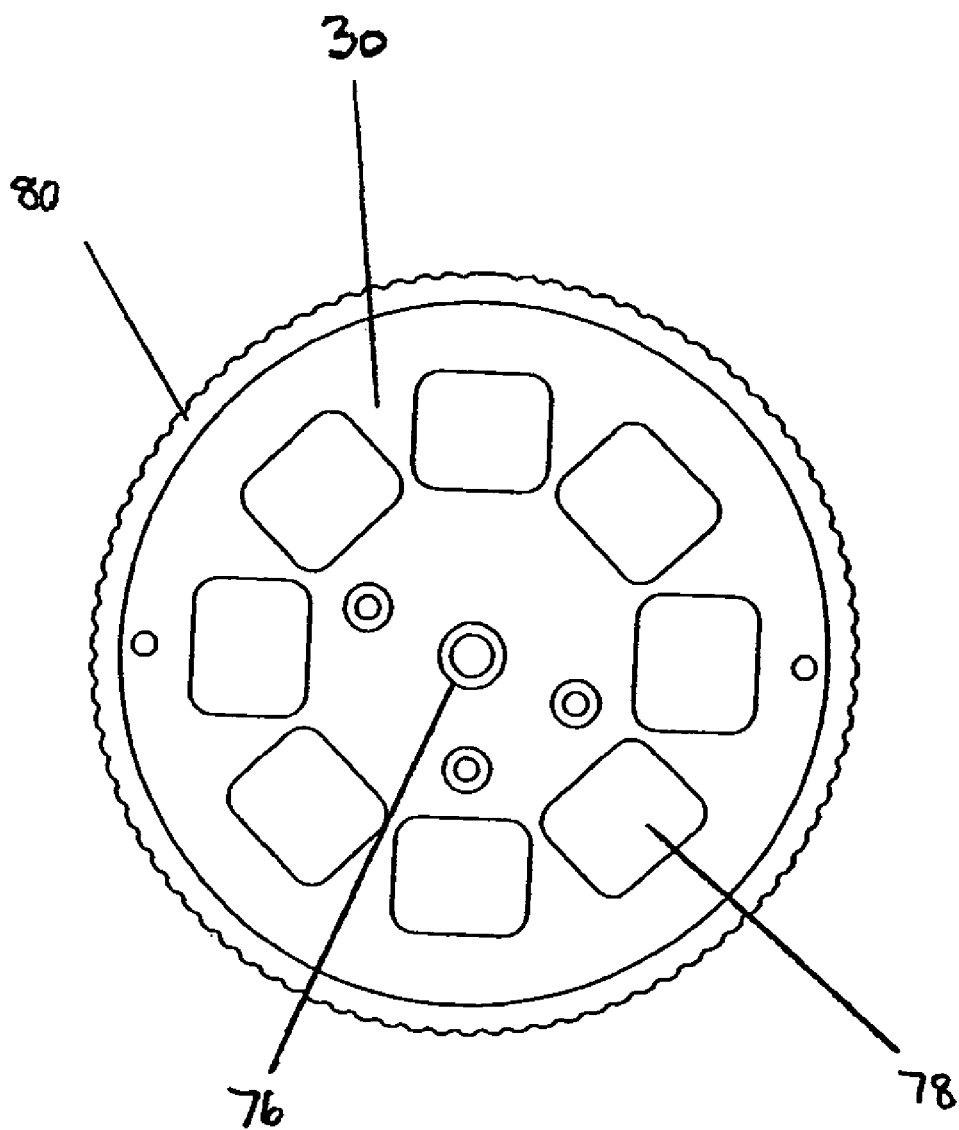
FIG. 7 is a top view of a video slide source.

A video slide source 30, as shown in FIG. 7, may be inserted into the casing 40 through the slot 28. The slot 28 is also configured to allow removal of the video slide source 30 by fingertip operation. The slot 28 is formed such that the video slide source 30 may be inserted and positioned along a sight line 58 passing from the center of the bulb 60 through the centers of the first lens 50 and the second lens 52. The video slide source 30, through axle 76, allows proper alignment of the video source 30 to the video source bulb 60. The video source bulb 60 provides illumination of the video slide source 30 through a circuit 108 seen in FIG. 9. As seen in FIG. 4, the video source bulb 60 may be accessed by separation of the frame first half 88 and the frame second half 90. The video source bulb 60 is maintained in place through a bulb retainer 64 which is held in compression against the video source bulb 60 through a spring 62. The bulb retainer 64 may be made of plastic, for example, to provide for lightness of weight and prevent electrical short-circuits from occurring. The spring 62 is biased such that expansion of the spring 62 places the bulb 60 in compression, consequently limiting movement. In an example embodiment, the spring 62 is made of an electrically conductive material, however the spring 62 may be made of non-electrically conductive material with the bulb electrical connection being established through other configurations.

Referring to FIG. 9, an example circuit 108 is shown. The circuit 108 may be comprised of the switch 32, the light source 63, connecting wiring 179 and the power source 102. The switch 32 is placed in the circuit 108 between the bulbs 60,61 and the power source 102. As shown, the switch 32 allows for fingertip actuation of the bulbs 60,61. Bulb activity may also be controlled through a timer 121 in the circuit 108 to limit battery drain to a predefined amount. Other configurations are possible, wherein the example embodiment disclosed presents a single typical design which may be used to power the aforementioned components.

Figure 5:
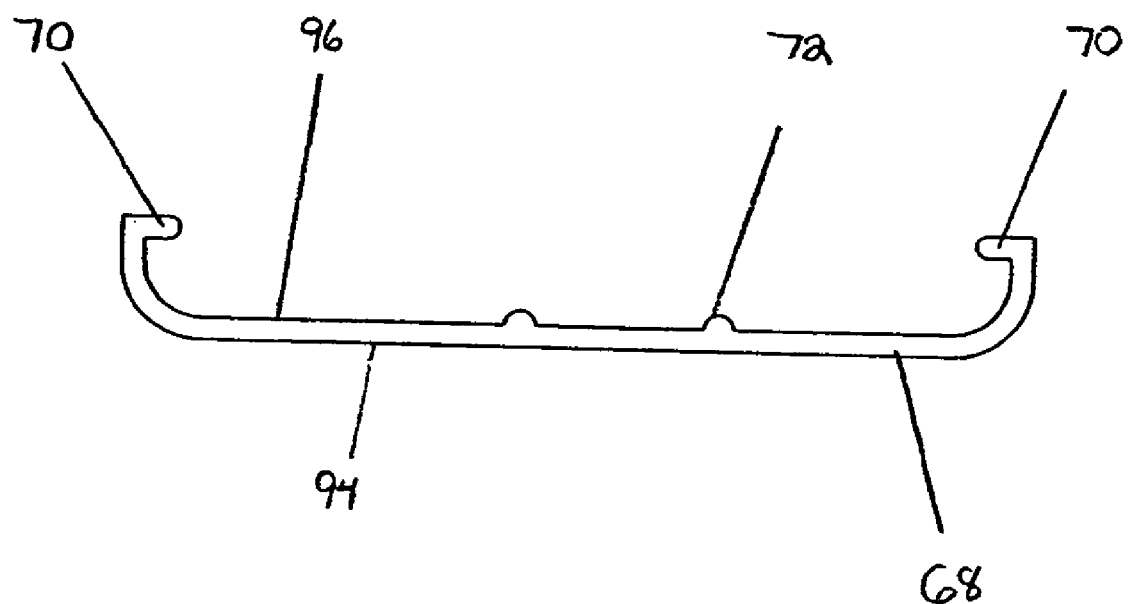
FIG. 5 is a side view of a projector holder.
Figure 6:
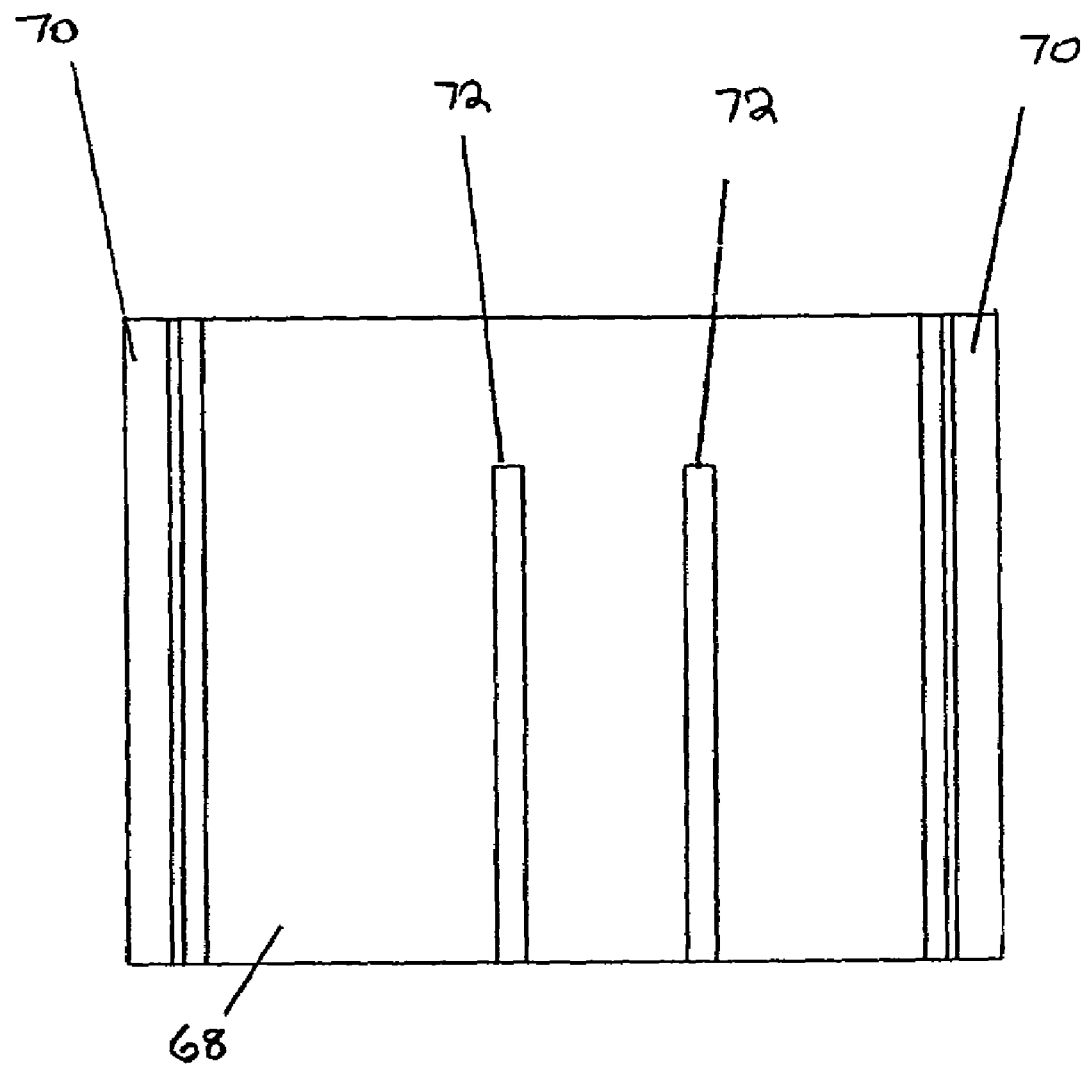
FIG. 6 is a top view of the holder of FIG. 5.

Referring to FIGS. 5 & 6, a holder 68 for the projector 20 is shown. The holder 68 is comprised of ridges 72 which are interposed between flanges 70. The holder 68 is designed such that a holder back side 94 may be attached to a surface, such as the back cover 19, by glue or other appropriate attachment. The holder front side 96 and the accompanying ridges 72 are designed with flanges 70 to correspondingly mate with the exterior geometry of the projector 20. Although shown as rounded, the ridges 72 may have any mating geometry.

Referring to FIG. 7, the video slide source 30 is shown in greater detail. The video slide source 30 may be formed in a circle, as an example, with a grip 80 on the exterior periphery. The video slide source 30 may also be formed as a strip or other geometric form. A spoke 76 allows for proper alignment of the video slide source 30 to the video source bulb 60 through contact with the stop 98. The grip 80 is positioned on the exterior edge of the video slide source 30 to allow for fingertip advancement between frames 78. The video slide source 30 may be numbered or identified by color, allowing the user to correctly choose the desired video slide source corresponding to a match marked story on the pages 14 of the book 12.

Figure 8:
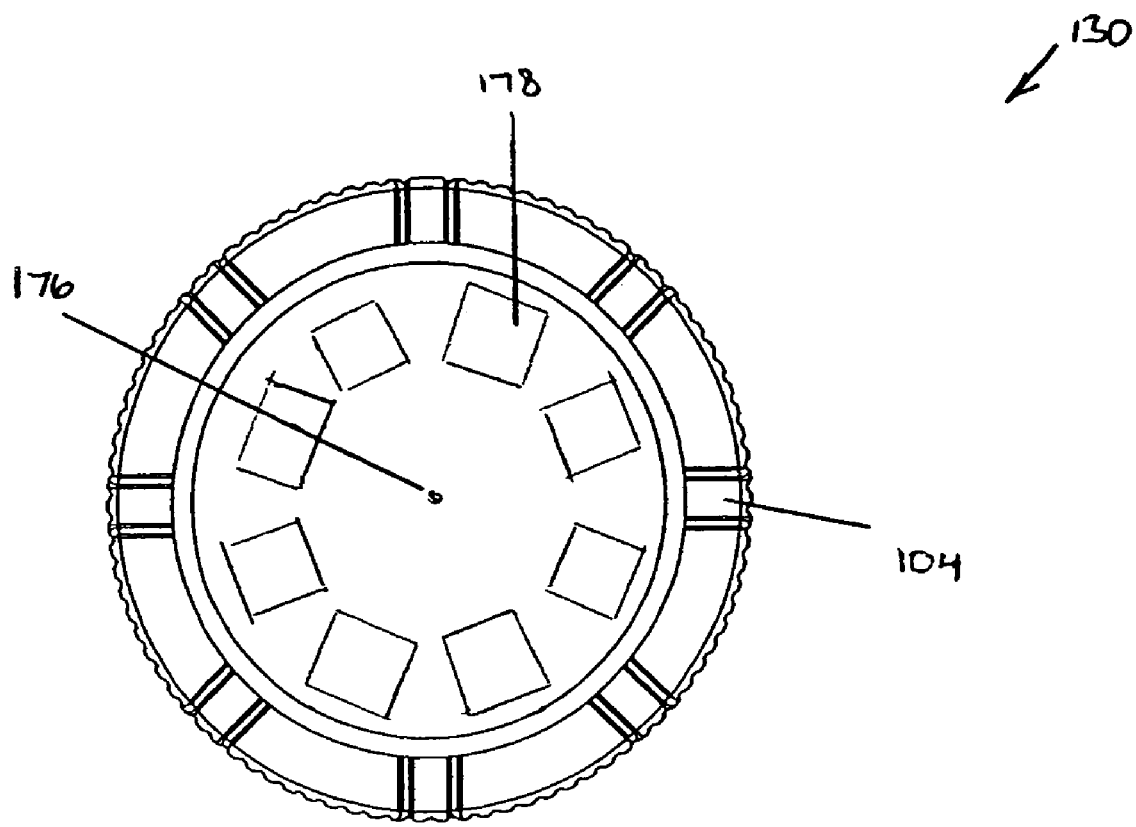
FIG. 8 is a top view of an alternate video slide source.

Referring to FIG. 8, a side view of an alternative video slide source 130 is shown. The alternative video slide source 130 has optional indentations 104 which correspond to a movable tab 106 in the casing 40. The alternative video slide source 130 is held in position by the movable tab 106 engaging the indentations 104 preventing excessive unintended rolling rotation of the video slide source 130. The video slide source 130 may be rotated between frames 178 by exerting additional rotational force on the video slide source 130 spinning it on its axle 176.

Operationally, the user selects a desired video slide source 30,130 from the video bin 29. The video slide source 30,130 is inserted into the slot 28 of the projector 20 sufficiently such that the axle 76,176 of the video slide source 30,130 contacts and rests upon the stop 96. The user then determines whether either single illumination or double illumination mode is to be chosen. In the case of double illumination herein described, the user fingertip operates the switch 32 to the third setting. The placement of the projector 20 in the third setting activates both the video source bulb 60 and the reading source bulb 61. The user then advances the video slide source 30,130 to the first desired frame 78,178 of the story to be read. The user then reads the desired story inside the book 12 on the designated pages 14. Upon corresponding operating instructions inside the book 12, the user manually advances the video slide source 30,130 to the corresponding frame dictated in the reading materials. At the end of the materials, the video slide source 30,130 may then be removed from the projector 20, placed back in the video bin 29 and the switch 32 turned to the second position deactivating the bulbs 60, 61.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A method to convey information to a reader comprising:
    inserting a slide source into a projector positioned on a book;
    actuating the projector;
    illuminating the book using a book light source in the projector;
    projecting an image from the projector;
    reading the book until operating instructions require advancing the slide source; and
    advancing the slide source.

2. A method to convey information to a reader comprising:
    inserting a slide source into a projector positioned on a book;
    actuating the projector;
    illuminating the book using a book light source in the projector:
    projecting an image from the projector; and
    reading the book pursuant to operating instructions from the slide source.

3. The method of claim 1, further comprising the step of focusing the projector so as to change a focal point of light emerging from the projector.

4. The method of claim 2, further comprising the step of focusing the projector so as to change a focal point of light emerging from the projector.

5. A method to convey information to a reader comprising:
    inserting a slide source into a projector positioned on a book;
    actuating the projector;
    illuminating the book using a book light source in the projector;
    projecting an image from the projector;
    reading the book until operating instructions require advancing the slide source;
    advancing the slide source; and
    adjusting the size of the image.

6. A method to convey information to a reader comprising:
    inserting a slide source into a projector positioned on a book;
    actuating the projector;
    illuminating the book using a book light source in the projector;

projecting an image from the projector;
reading the book pursuant to operating instructions from the slide source; and
adjusting the size of the image.

7. A method to convey information to a reader comprising:
inserting a slide source into a projector positioned on a book;
actuating the projector;
illuminating the book using a book light source in the projector;
projecting an image from the projector;
reading the book until operating instructions require advancing the slide source; and
advancing the slide source;
wherein the slide source is inserted into the projector between a slide light source and a lens of the projector.

8. A method to convey information to a reader comprising:
inserting a slide source into a projector positioned on a book;
actuating the projector;
illuminating the book using a book light source in the projector;
projecting an image from the projector; and
reading the book pursuant to operating instructions from the slide source;
wherein the slide source is inserted into the projector between a slide light source and a lens of the projector.

9. A method to convey information to a reader comprising:
inserting a slide source into a projector positioned on a book;
actuating the projector;
illuminating the book using a book light source in the projector;
projecting an image from the projector;
reading the book until operating instructions require advancing the slide source; and
advancing the slide source;
wherein the slide source is advanced by rotating the slide source in the projector.

10. A method to convey information to a reader comprising:
inserting a slide source into a projector positioned on a book;
actuating the projector;
illuminating the book using a book light source in the projector;
projecting an image from the projector;
reading the book pursuant to operating instructions from the slide source; and
projecting another image by rotating the slide source in the projector.

11. The method of claim 7, wherein the projector includes a transparent portion separate from the lens, the light source configured to illuminate the book through the transparent portion.

12. The method of claim 8, wherein the projector includes a transparent portion separate from the lens, the light source configured to illuminate the book through the transparent portion.

13. A method to convey information to a reader comprising:
inserting a slide source into a projector positioned on a book;
actuating the projector;
projecting an image from the projector;
reading the book until operating instructions require advancing the slide source; and
advancing the slide source,
wherein the slide source is circular and is inserted into a slot in the projector, a portion of the slide source remaining outside the projector, and wherein the slide source is advanced by manually engaging the portion so as to rotate the slide source about a central axis if the slide source.

* * * * *